United States Patent
Horne

(10) Patent No.: US 9,926,167 B1
(45) Date of Patent: Mar. 27, 2018

(54) MOBILE WIRE DISPENSER APPARATUS

(71) Applicant: Eric L. Horne, Conway, SC (US)

(72) Inventor: Eric L. Horne, Conway, SC (US)

(*) Notice: Subject to any disclaimer, the term of this patent is extended or adjusted under 35 U.S.C. 154(b) by 196 days.

(21) Appl. No.: 14/599,540

(22) Filed: Jan. 18, 2015

Related U.S. Application Data

(63) Continuation-in-part of application No. 13/109,070, filed on May 17, 2011, now abandoned.

(60) Provisional application No. 61/395,776, filed on May 17, 2010.

(51) Int. Cl.
B65H 49/20 (2006.01)
B65H 49/32 (2006.01)

(52) U.S. Cl.
CPC .......... B65H 49/20 (2013.01); B65H 49/32 (2013.01)

(58) Field of Classification Search
CPC ...... B65H 49/20; B65H 49/32; B65H 18/145; B65H 75/146; B65H 75/403; B62B 2202/025
USPC ........................................... 242/557
See application file for complete search history.

(56) References Cited

U.S. PATENT DOCUMENTS

| | | | |
|---|---|---|---|
| 2,481,224 A | 9/1949 | Joswick | |
| 2,913,191 A * | 11/1959 | Nelson | B21C 49/00 242/474.9 |
| 3,009,667 A * | 11/1961 | Browne | B65H 49/32 242/391.1 |
| 3,050,273 A | 8/1962 | Saunders | |
| 3,606,371 A * | 9/1971 | Rousseau et al. | B62B 1/264 16/438 |
| 3,680,807 A * | 8/1972 | Fortson | B21C 47/28 242/118.62 |
| 3,831,877 A * | 8/1974 | Bennett | B65H 75/22 242/129 |
| 3,856,230 A | 12/1974 | Zimmer | |
| 3,937,413 A * | 2/1976 | Devine | B65H 49/38 242/557 |
| 3,944,094 A * | 3/1976 | Compton | B60P 3/035 254/2 R |
| 3,985,341 A * | 10/1976 | Akre | B63B 35/816 188/77 R |
| 4,095,706 A * | 6/1978 | Schwien | A01D 87/127 242/557 |
| 4,137,939 A | 2/1979 | Chow | |
| 4,166,589 A * | 9/1979 | Hoover | B65B 67/085 156/577 |
| 4,190,211 A * | 2/1980 | Janzen | B65H 49/32 242/423.1 |
| 4,279,389 A * | 7/1981 | Thomas | B65H 75/26 242/129.51 |
| 4,353,515 A * | 10/1982 | Weaver | B65H 49/26 242/129.6 |
| 4,360,172 A * | 11/1982 | Cope | A01K 89/003 242/134 |
| 4,391,422 A | 7/1983 | McDonald | |

(Continued)

Primary Examiner — Emmanuel M Marcelo
Assistant Examiner — Michael E Gallion
(74) Attorney, Agent, or Firm — P. Jeff Martin; The Law Firm of P. Jeffrey Martin, LLC

(57) ABSTRACT

A mobile wire dispenser apparatus includes a base frame to which an upper frame is releasably lockable. The apparatus further includes a primary spool mounting assembly for supporting a first spool of wire and a secondary spool mounting assembly for supporting a second spool of wire. To facilitate mobility, the apparatus includes a plurality of wheels and an elongated handle.

7 Claims, 8 Drawing Sheets

(56) References Cited

U.S. PATENT DOCUMENTS

| | | | |
|---|---|---|---|
| 4,447,012 A * | 5/1984 | Woodruff | B65H 16/06 242/423.1 |
| 4,457,527 A * | 7/1984 | Lowery | B25H 1/04 182/127 |
| 4,564,152 A * | 1/1986 | Herriage | B65H 49/32 242/422.4 |
| 4,711,407 A * | 12/1987 | Boon | B62B 3/10 242/557 |
| 4,746,078 A | 5/1988 | Setzke | |
| 5,246,180 A * | 9/1993 | Berry | B65H 49/32 242/129.51 |
| 5,308,012 A * | 5/1994 | Fuller | B65H 49/321 242/557 |
| 5,509,671 A * | 4/1996 | Campbell | B62B 1/264 242/557 |
| 5,577,745 A * | 11/1996 | Birk | B62B 1/12 242/129.5 |
| 5,667,163 A | 9/1997 | Sordahl | |
| 5,915,646 A * | 6/1999 | Campbell | B65H 49/32 242/403.1 |
| 6,685,132 B1 * | 2/2004 | Allen | B65H 49/32 242/557 |
| 6,951,316 B1 | 10/2005 | Heidelberger | |
| 7,044,414 B1 | 5/2006 | McQuerry | |
| D542,124 S | 5/2007 | Sellers | |
| 7,398,979 B2 | 7/2008 | Yu Chen | |
| 7,401,449 B2 * | 7/2008 | Watson | B65B 67/085 242/423 |
| 7,484,684 B2 * | 2/2009 | Saavedra | B62B 1/26 242/391 |
| 9,284,085 B2 * | 3/2016 | Pace | B65B 67/085 |
| 9,403,659 B2 * | 8/2016 | Galindo Gonzalez | B65H 75/241 |
| 2003/0080236 A1 * | 5/2003 | Armstrong | B65H 16/005 242/557 |
| 2004/0245362 A1 * | 12/2004 | Ast | B65H 75/146 242/388.6 |
| 2006/0038053 A1 * | 2/2006 | Giovannoni | B65H 57/06 242/557 |
| 2007/0079578 A1 * | 4/2007 | Yu Chen | B65B 67/085 53/592 |
| 2008/0048063 A1 * | 2/2008 | Wells | B65H 49/32 242/557 |

* cited by examiner

MOBILE WIRE DISPENSER APPARATUS

RELATED APPLICATIONS

The present application is a Continuation-in-Part of application Ser. No. 13/109,070, filed on May 17, 2011, which claims the benefit of priority to U.S. Provisional Application No. 61/395,776 filed on May 17, 2010.

BACKGROUND OF THE INVENTION

1. Field of the Invention

The present invention relates generally to devices for dispensing spools of rolled products and, more particularly, to a mobile wire dispenser apparatus.

2. Description of the Related Art

Currently there exist in the art various reel or spool dispenser systems to which spools may be loaded and dispensed. However, the prior art has failed to disclose or teach a highly portable, wire dispenser apparatus adapted for supporting at least one spool of wire, and which allows for the loading of a second spool of wire onto the invention without requiring the user to handle or lift the second spool in the conventional sense, in a manner which is quick, easy, and efficient.

Accordingly, a need exists for a highly portable, wire dispenser apparatus adapted for supporting at least one spool of wire, and which allows for the loading of a second spool of wire onto the invention without requiring the user to handle or lift the second spool in the conventional sense.

The development of mobile wire dispenser apparatus fulfills this need.

A search of the prior art did not disclose any patents that read directly on the claims of the instant invention; however, the following references were considered related:

U.S. Pat. No. 3,050,273, issued in the name of Saunders;
U.S. Pat. No. 5,509,671, issued in the name of Campbell;
U.S. Pat. No. 5,667,163, issued in the name of Sordahl;
U.S. Pat. No. 0,542,124 S, issued in the name of Sellers;
U.S. Pat. No. 7,044,414 B1, issued in the name of McQuerry;
U.S. Pat. No. 6,951,316 B1, issued in the name of Heidelberger;
U.S. Pat. No. 7,398,979 B2, issued in the name of Yu Chen;
U.S. Pat. No. 3,009,667, issued in the name of Browne;
U.S. Pat. No. 3,856,230, issued in the name of Zimmer;
U.S. Pat. No. 4,391,422, issued in the name of McDonald;
U.S. Pat. No. 2,481,224, issued in the name of Joswick;
U.S. Pat. No. 4,137,939, issued in the name of Chow; and
U.S. Pat. No. 4,746,078, issued in the name of Setzke.

Consequently, a need has been felt for a mobile wire dispenser apparatus adapted for supporting at least one spool of wire, and which allows for the loading of a second spool of wire onto the invention without requiring the user to handle or lift the second spool in the conventional sense. This application presents claims and embodiments that fulfill a need or needs not yet satisfied by the products, inventions and methods previously or presently available. In particular, the claims and embodiments disclosed herein describe a mobile wire dispenser apparatus having a base frame, primary spool mounting assembly, secondary spool mounting assembly, upper frame with pair of A-shaped frameworks, elongated handle, means for maintaining wire tension and for preventing wire backlash, recoil, and snarling, and an apparatus support mechanism, the mobile wire dispenser apparatus providing unanticipated and nonobvious combination of features distinguished from the products, inventions and methods preexisting in the art. The applicant is unaware of any product, method, disclosure or reference that discloses the features of the claims and embodiments disclosed herein.

SUMMARY OF THE INVENTION

Briefly described according to one embodiment of the present invention, a mobile wire dispenser apparatus is provided for supporting at least one spool of wire. The apparatus comprises a base frame for supporting an upper frame, the base frame comprising a vertical member having opposed free ends to which upper ends of a first and second horizontal member are welded or molded integral thereto, respectively. The first horizontal member and the second horizontal member each include an ear welded or formed integral to a lower surface thereof. An axle member is suitably mounted to each ear for supporting a wheel.

The upper frame is releasably lockable to the base frame, wherein the upper frame comprises a first longitudinal member and a second longitudinal member each having a spool axle capturing arm. The upper frame further comprises a first long side member and a second long side member having forward ends welded or molded integral perpendicularly to the upper surface of the first longitudinal member and the second longitudinal member, respectively. The first and second long side members each having rearward ends welded or molded integral to a cross member.

A first oblique member is disclosed having an upper, inner end welded or molded integral angularly to the rearward end of the first long side member, and a lower, inner end welded or molded integral angularly to the lower end of the first longitudinal member.

A second oblique member is disclosed having an upper, inner end welded or molded integral angularly to the rearward end of the second long side member, and a lower end welded or molded integral angularly to the lower end of the second longitudinal member. The first longitudinal member, first long side member, and first oblique member collectively form a first A-shaped framework, and the second longitudinal member, second long side member, and second oblique member collectively form a second A-shaped framework, the pair of A-shaped frameworks being mirror images of one another.

The base frame is provided with a primary spool mounting assembly for supporting a first spool of wire. The pair of A-shaped frameworks is provided with a secondary spool mounting assembly for supporting a second spool of wire.

An elongated handle is provided, wherein handle defines a C-shaped handle grip.

A means for maintaining wire tension and for preventing wire backlash, recoil, and snarling (or tangling) due to the rotational inertia of the wire as it is unwound from the first and second spools of wire and is disclosed.

A support mechanism is provided for supporting the apparatus of the present invention in an upright or standing, self-supported manner without the aid or assistance of the operator.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

Detailed Description of the Figure

Figure 1:
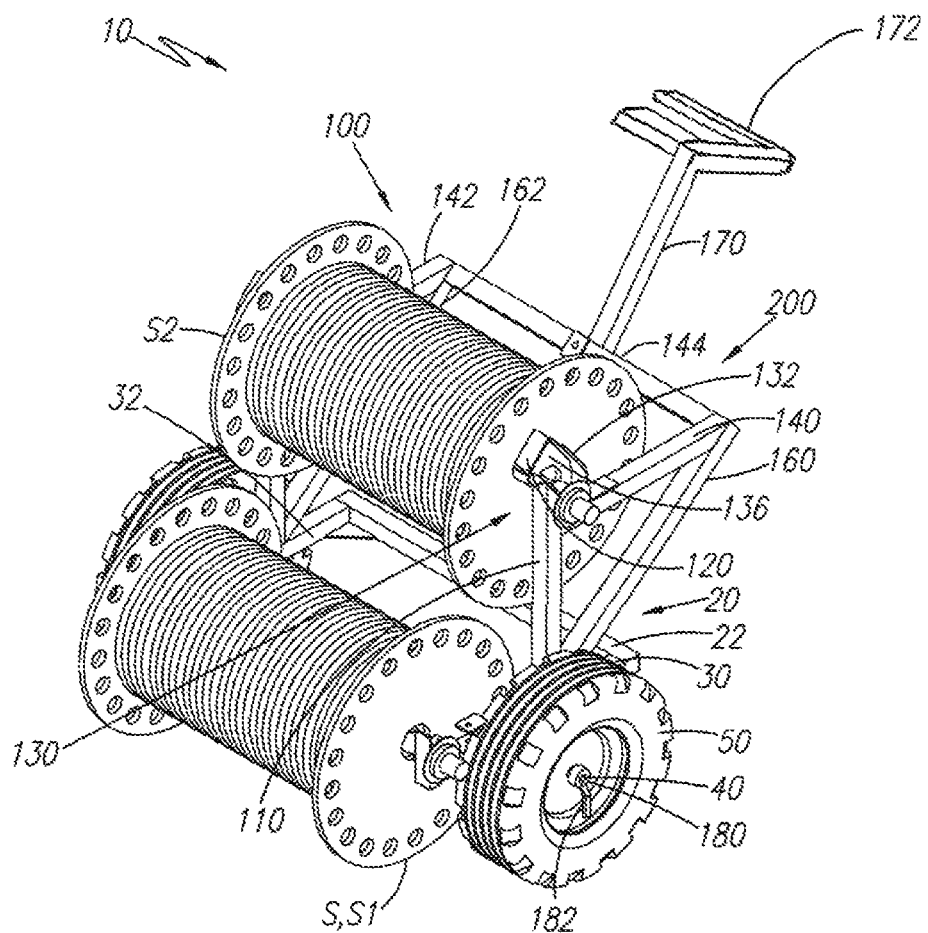
FIG. 1 is a left side elevational view of a mobile wire dispenser apparatus, according to one embodiment of the present invention.

Referring now to FIGS. 1-6, a mobile wire dispenser apparatus is shown, according to one embodiment of the present invention. The mobile wire dispenser apparatus 10, hereinafter referred to as "apparatus 10", comprises a base frame 20 for supporting an upper frame 100, the base frame 20 comprising a vertical member 22 having opposed free ends to which upper ends of a first 30 and second horizontal member 32 are welded or molded integral thereto, respectively. The first 30 and second horizontal member 32 are welded or formed integral to the vertical member 22 so as to extend away from the vertical member 22 in a substantially perpendicular orientation. The first horizontal member 30 and the second horizontal member 32 each include an ear 33 welded or formed integral to a lower surface thereof, as more clearly shown in FIG. 5. An axle member 40 is suitably mounted to each ear 33 for supporting a wheel 50. Each axle member 40 includes lateral ends to which a wheel 50 is mounted.

The upper frame 100 comprises a first longitudinal member 110 having a spool axle capturing arm 120 welded or formed integral to an upper surface thereof, about an anterior end of the first longitudinal member 110. More specifically, the spool axle capturing arm 120 defines a generally L-shaped configuration having a lower segment 120a welded or formed integral to the upper surface of the first longitudinal member 110. The spool axle capturing arm 120 defines an angular measure of approximately 80°.

The upper frame 100 further comprises a second longitudinal member 115 having a spool axle capturing arm 124 welded or formed integral to an upper surface thereof, about an anterior end of the second longitudinal member 115. The spool axle capturing arm 124 defines a generally L-shaped configuration having a lower segment 124a welded or formed integral to the upper surface of the second longitudinal member 115. The spool axle capturing arm 124 defines an angular measure of approximately 80°. The spool axle capturing arms 120, 124 provide unanticipated and nonobvious advantages and features of the present invention, to be described later in greater detail.

Figure 2:
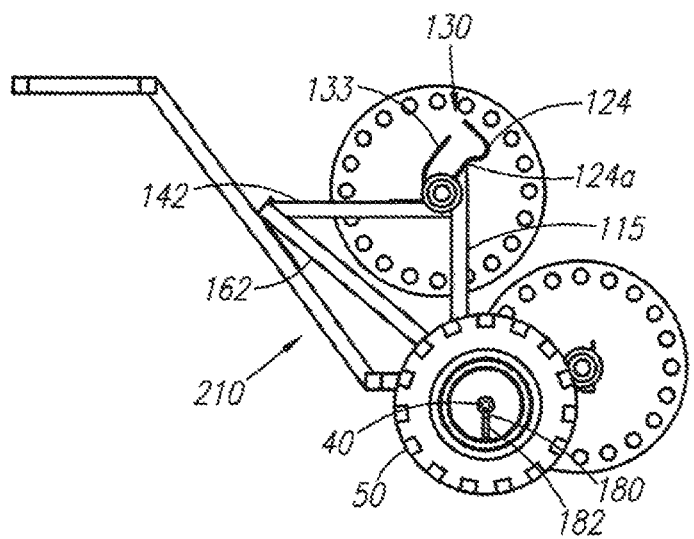
FIG. 2 is a right side elevational view of the apparatus of FIG. 1.
Figure 3:
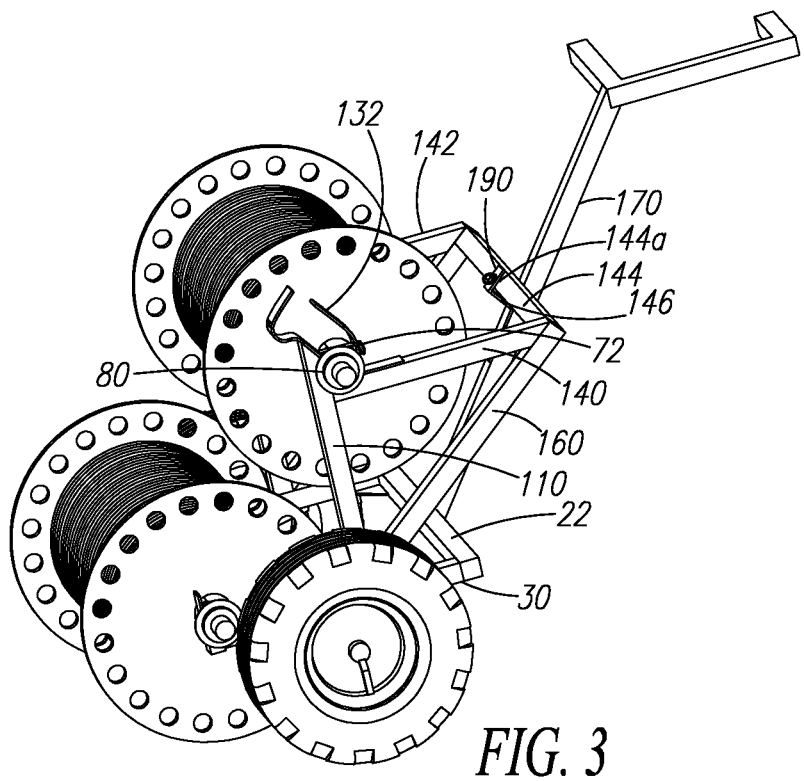
FIG. 3 is a left side elevational view of the mobile wire dispenser apparatus, according to one embodiment of the present invention.
Figure 3A:
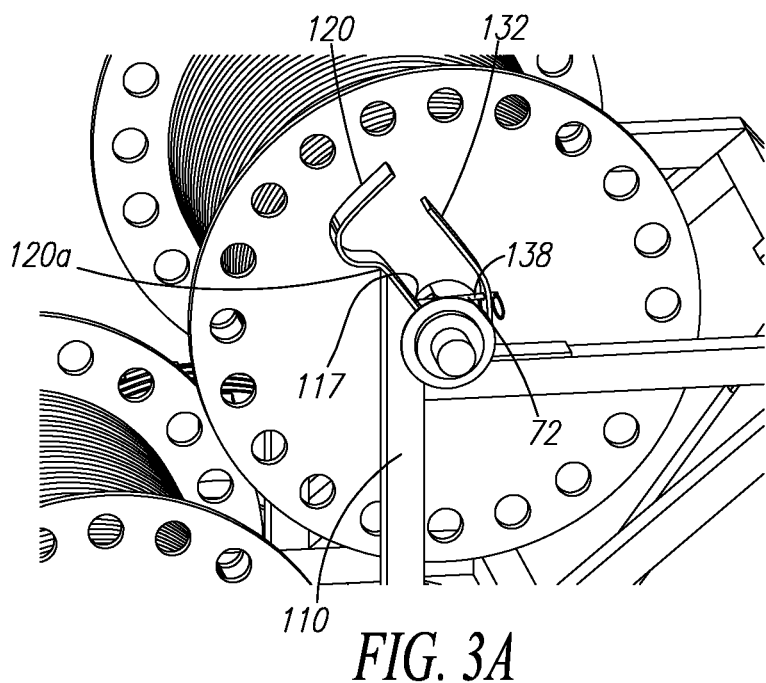
FIG. 3A is a partial side elevational view of the upper frame illustrating one of the spool axle capturing arms thereof, according to one embodiment of the present invention.
Figure 4:
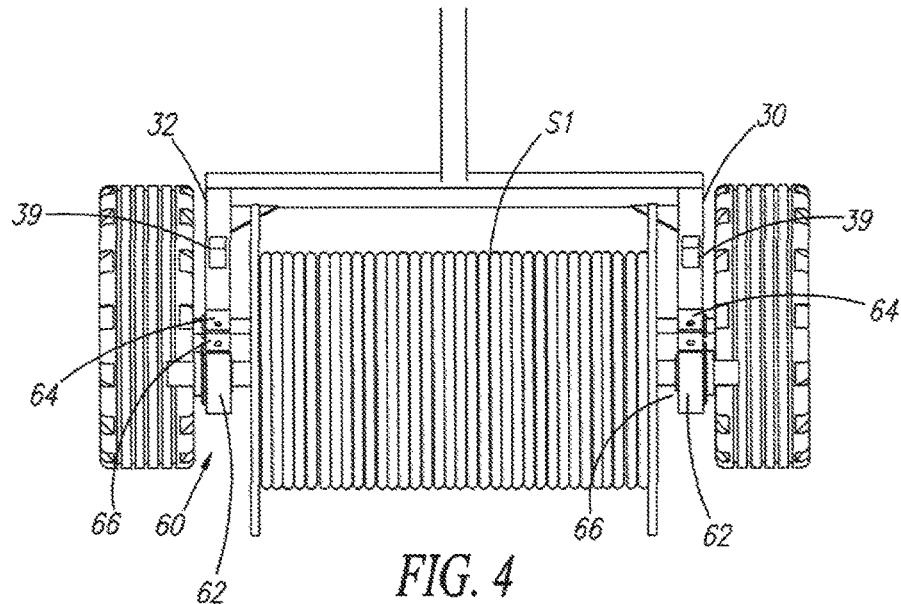
FIG. 4 is a top plan view of the present invention shown with the upper frame removed, according to one embodiment thereof.
Figure 5:
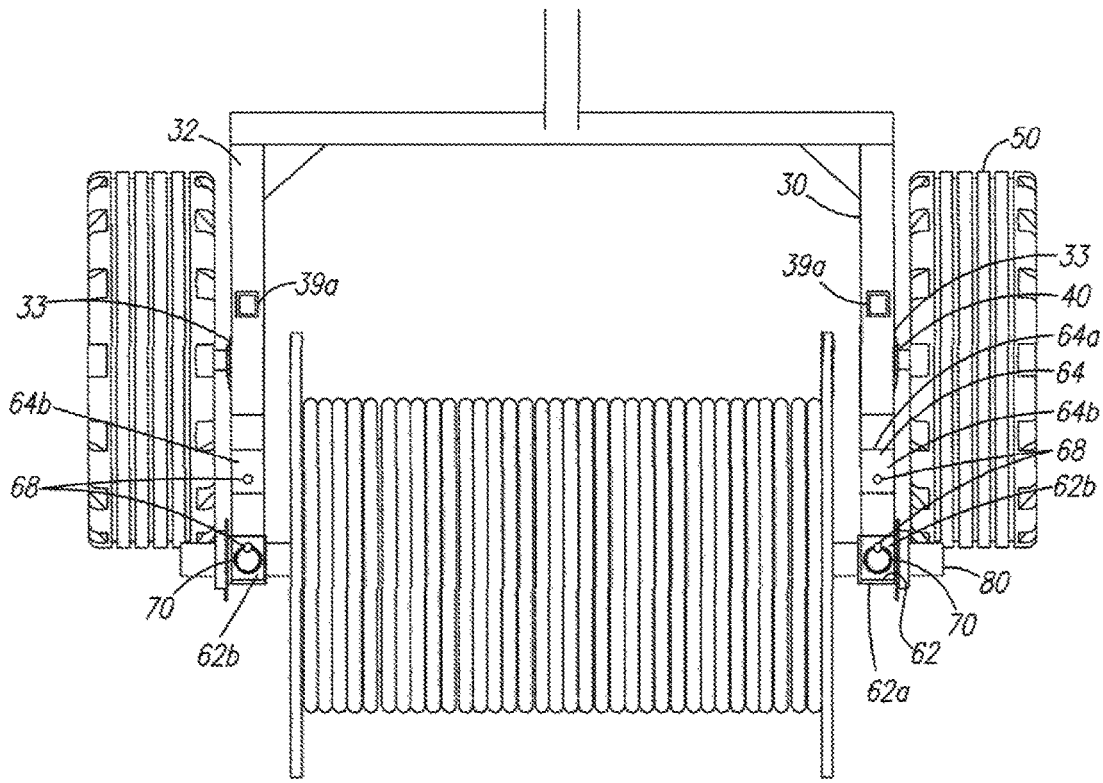
FIG. 5 is a top plan view of the base frame illustrating the arm of each the first horizontal member and second horizontal member of the base frame, according to one embodiment of the present invention.
Figure 5A:
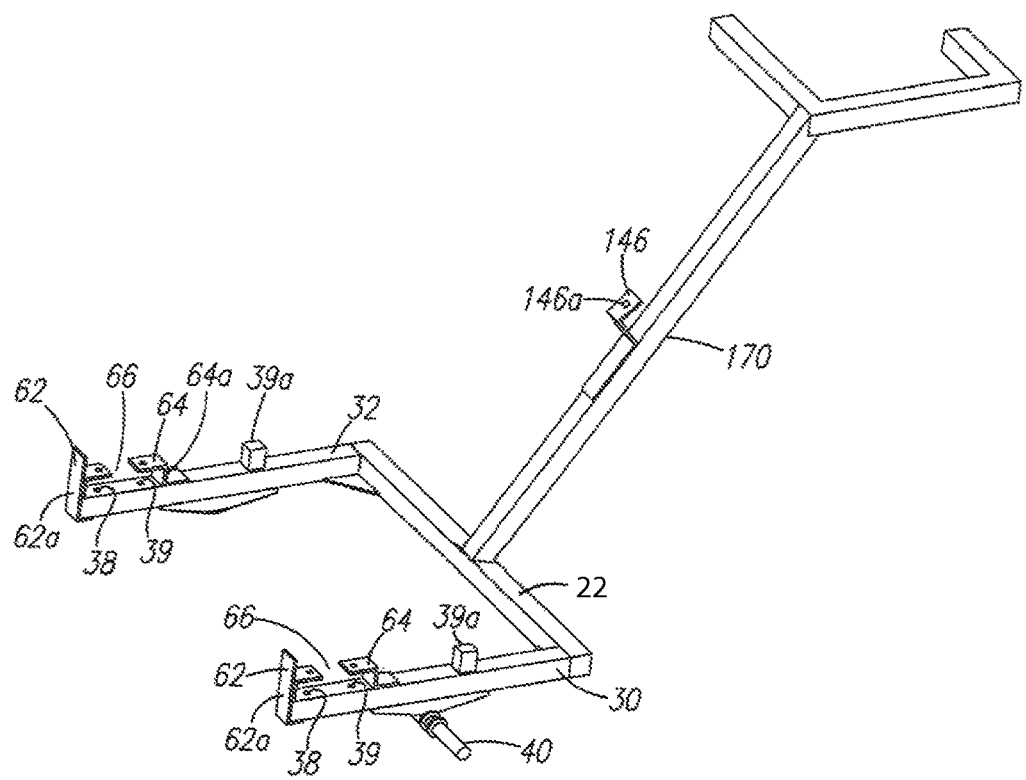
FIG. 5A is a left side elevational view of the present invention shown with the upper frame removed to illustrate the spool axle retainer of the primary spool mounting assembly, according to one embodiment thereof.
Figure 6:
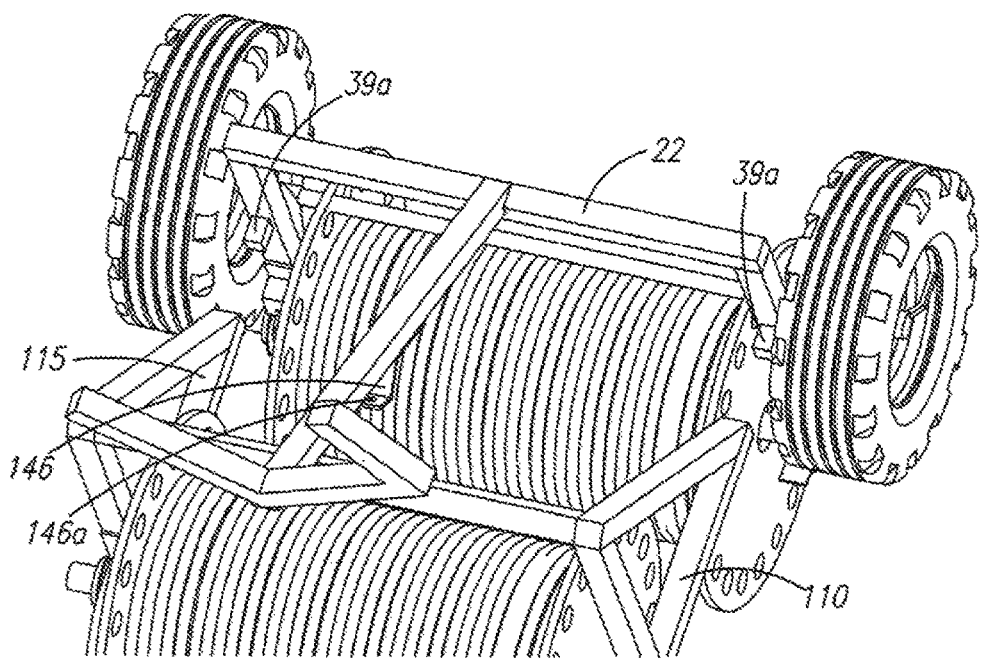
FIG. 6 is a partial perspective view illustrating releasable attachment of the upper frame to the base frame, according to one embodiment of the present invention.

Referring now more specifically to FIGS. 1-3, the upper frame 100 further comprises a first long side member 140 and a second long side member 142 having forward ends welded or molded integral perpendicularly to the upper surface of the first longitudinal member 110 and the second longitudinal member 115, respectively, below respective spool axle capturing arms 120, 124 thereof. The first and second long side members 140 and 142 each having rearward ends welded or molded integral to a cross member 144.

In reference to FIGS. 1-2, a first oblique member 160 is disclosed having an upper, inner end welded or molded integral angularly to the rearward end of the first long side member 140, and a lower, inner end welded or molded integral angularly to the lower end of the first longitudinal member 110.

A second oblique member 162 is disclosed having an upper, inner end welded or molded integral angularly to the rearward end of the second long side member 142, and a lower end welded or molded integral angularly to the lower end of the second longitudinal member 115. The first longitudinal member 110, first long side member 140, and first oblique member 160 collectively form a first A-shaped framework 200, and the second longitudinal member 115, second long side member 142, and second oblique member 162 collectively form a second A-shaped framework 210, the pair of A-shaped frameworks 200 and 210 being mirror images of one another.

Referring now more particularly to FIGS. 1 and 4-5A, the base frame 20 is provided with a primary spool mounting assembly 60 for supporting a first spool S1 of wire. The primary spool mounting assembly 60 comprises a T-shaped arm 62 and a L-shaped arm 64 welded or formed integral to an upper surface of each the first horizontal member 30 and the second horizontal member 32. The T-shaped arm 62 is positioned at a lower end of each the first horizontal member 30 and the second horizontal member 32. The L-shaped arm 64 is positioned distal to the T-shaped arm 62, thereby forming a spool axle retainer 66 for retaining a spool axle 80, the spool axle 80 supporting a spool S of wire therearound. A typical spool S of wire is defined with an axial hole through which the spool axle 80 is inserted. Thus, the spool axle retainer 66 allows for selective longitudinal positioning of a first spool S1 about the retainer 66. The T-shaped arm 62 is defined of a vertical portion 62a from which a horizontal portion 62b extends perpendicularly about a mid-segment of vertical portion 62a, the horizontal portion 62b being aligned parallel with the respective horizontal member 30, 32. The L-shaped arm 64 is defined of a vertical portion 64a having an upper end from which a horizontal portion 64b extends perpendicularly therefrom so as to face the horizontal portion 62b of the T-shaped arm 62, the horizontal portion 64b of the L-shaped arm 64 being aligned parallel with the respective horizontal member 30, 32.

The horizontal portion 62b, 64b of each the T-shaped arm 62 and the L-shaped arm 64, respectively, has an aperture 68 which extends therethrough and is alignable respectively with apertures, 38, 39 in the first horizontal member 30 and the second horizontal member 32. A pin 70 is removably inserted into the aperture 68 of the horizontal portion 62b, 64b of each the T-shaped arm 62 and the L-shaped arm 64 and through the apertures 38, 39 of the first horizontal member 30 and the second horizontal member 32 for releasably locking lateral ends of the spool axle 80 within the spool axle retainer 66, and thereby releasably locking the first spool S1 within the spool axle retainer 66.

Referring now to FIGS. 1-3A, a secondary spool mounting assembly 130 is provided for supporting a second spool S2 of wire, wherein assembly 130 comprises a pair of retaining arms 132, 133 each having an L-shaped body, the retaining arms 132, 133 are each welded or formed integral to an upper surface of each the first long side member 140 and the second long side member 142, respectively, thereby forming a spool axle retainer 136 for retaining a spool axle 80, the spool axle 80 supporting a second spool S2 therearound. Thus, the spool axle retainer 136 allows for secured positioning of a second spool S2 within the retainer 136. The retaining arms 132 oppose the spool axle capturing arms 120, 124. The retaining arms 132, 133 each having its lower end bent to form a foot for suitable mounting to the upper surface of the first long side member 110 and the second long side member 142, respectively.

For purposes of this disclosure, the present invention may support spools S of electrical wire of different gauges and types. Significantly however, the use of the present invention is particularly advantageous for spools S wound with heavy electrical wire of the type used by electricians who wire industrial, commercial, and residential buildings.

The elongated body portion of each retaining arm 132, 133 has a hole 138 which extends therethrough and is alignable with a hole 117, respectively, in the first longitudinal member 110 and the second longitudinal member 115. A pin 72 is removably inserted in the hole of the elongated body portion of each retaining arm 132, 133 and through the hole 117 of each the first longitudinal member 110 and the second longitudinal member 115 for releasably locking lateral ends of a spool axle 80 within the spool axle retainer 136, and thereby releasably locking the second spool S2 within the spool axle retainer 136.

Figure 7:
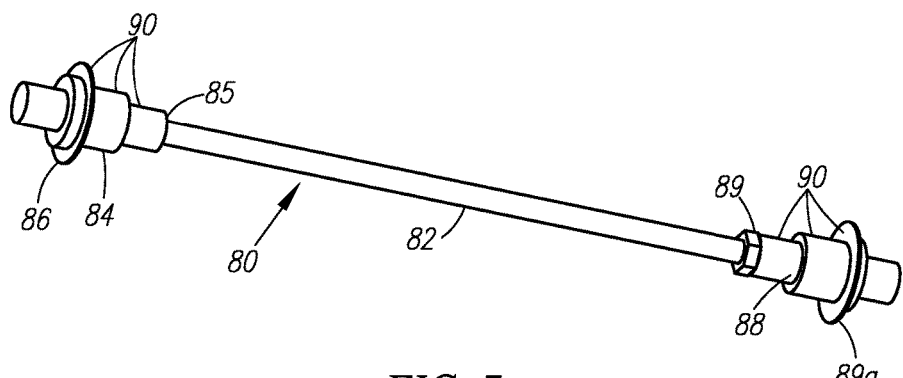
FIGS. 7-8 illustrate an alternate embodiment of the present invention.
Figure 8:
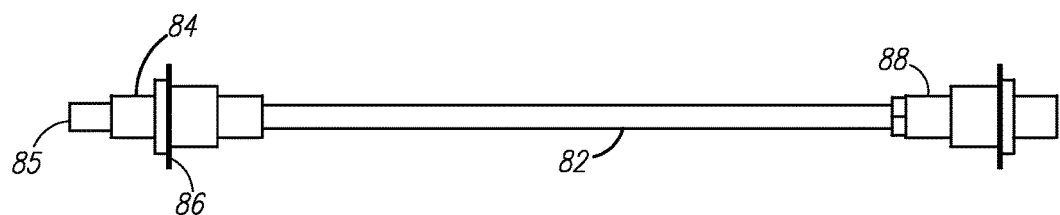

Referring now to FIGS. 7-8, in accordance with one alternate embodiment of the present invention, the spool axle 80 is adapted and configured for supporting spools S of various axial hole diametric measures, such as, but not limited to 0.625", 1.5", 2", and 2.5". The spool axle 80 defines an elongated body 82 having opposed ends, the opposed ends each slidably receive a spool hole adapter 84, 88. The adapters 84, 88 each include a plurality of cylinders 90 axially aligned and integrally joined in a stacked fashion, wherein the cylinders 90 increasing in diameter sequentially from the first end 85, 89 to the second end 86, 89a of the adapter 84, 88, respectively. The cylinders 90 are further configured such that cylinders 90 may be slidably received by the opposed ends of elongated body 82, respectively in a manner such that either the first end 85, 89 or second end 86, 89a may slidably engage opposed ends of axle 80. FIG. 7 illustrates the first end 85, 89 of each respective adapter 84, 88 being received first by ends of elongated body 82, and FIG. 8 illustrates the second end 86 of one adapter 84 being received first by ends of elongated body 82. Thus, the adapters 84, 88 define ends being slidably interchangeable for engagement with opposed ends of the elongated body 82 of axle 80.

Referring now to FIGS. 1, 3, 5, 5A, and 6, the upper frame 100 is adapted and configured to be releasably locked to the base frame 20. The first longitudinal member 110 and second longitudinal member 115 each define a hollow configuration having a lower end for telescopically receiving a spline 39a welded or formed integral perpendicularly to an upper surface of the first horizontal member 30 and second horizontal member 32, respectively, and each the spline 39a oriented adjacent each respective L-shaped arm 64, thereof.

An elongated cylindrical handle 170 has a bottom end welded or molded integral to the upper surface of the vertical member 22 of the base frame 20 about an elongated centerline of the vertical member 22. An upper surface of the elongated handle 170, about a mid-segment thereof, includes a generally Z-shaped catch 146 for receiving and holding cross member 144 of upper frame 100 therein.

In order to releasably lock cross member 144, and hence, the first and second A-shaped frameworks 200 and 210 to the Z-shaped catch 146, a pin 190 is removably inserted in a hole 146a defined through the U-shaped catch 146, and through a hole 144a defined through a sidewall of the cross member 144.

The top end of elongated handle 170 includes a C-shaped handle grip 172 welded or molded integral thereto.

The secondary spool mounting assembly 130 affords important, unanticipated, nonobvious functional utility to the present invention. Once a first spool S1 has been releasably locked within the spool axle retainer 66, the handle 170, using the C-shaped handle grip 172, is pulled towards and over the first spool S1 in a manner such as to align and engage the spool axle capturing arms 120, 124 with lateral ends, respectively, of a spool axle 80 of a second spool S2 positioned stationary on the ground. Upon engagement by spool axle capturing arms 120, 124 with lateral ends of the spool axle 80 of the second spool S2, the handle 170 is pulled in an opposite direction over the first spool S1, thereby loading the second spool S2 into the spool axle retainer 136. Thus, the spool axle capturing arms 120, 124 allow for the loading of a second spool S2 onto the apparatus 10 of the present invention without requiring the user to handle or lift the second spool S2 in the conventional sense.

In addition, the shape and configuration of the apparatus 10 of the present invention and as well as the alignment of the spool axle retainers 66 and 136 and axle members 40 with respect thereto, are designed and configured so as to allow the apparatus 10, whether loaded with or without spools S1, S2, to be positioned in an upright, balanced orientation when C-shaped handle grip 172 is engaged against a means of external vertical support, such as an upright pole or wall (neither shown).

In reference to FIGS. 1-2, a brake device 180 is provided for locking the wheels 50. The brake device 180 may be an incurvate handle which threadedly engages the lateral ends of the axle members 40.

Figure 9:
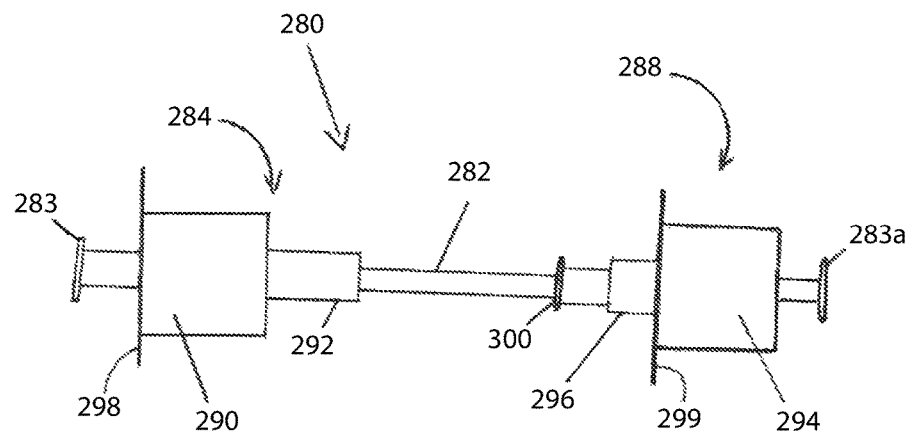
FIG. 9 is a side elevational view illustrating a backlash prevention device, in accordance to one embodiment of the present invention.
Figure 10:
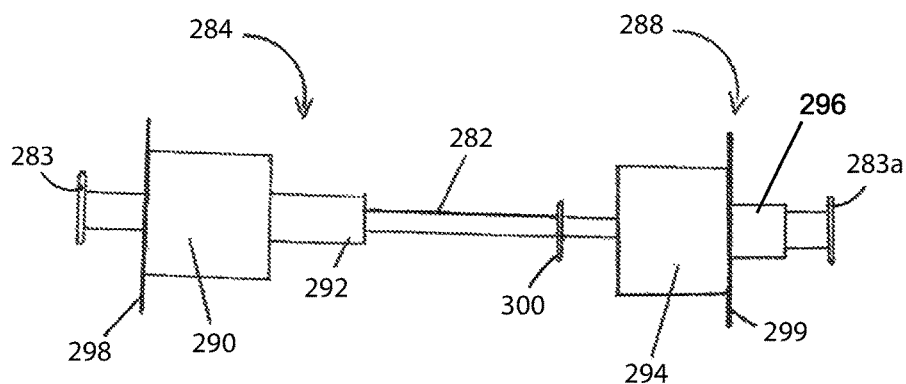
FIG. 10 is a side elevational view of the backlash prevention device of FIG. 9 showing an adapter thereof positioned in a reversed orientation, in accordance to one embodiment of the present invention.

Referring now more specifically to FIGS. 9 and 10, a means for maintaining wire tension and for preventing wire backlash, recoil, and snarling (or tangling) due to the rotational inertia of the wire as it is unwound from the first and second spools of wire S1 and S2 is disclosed. The wire tensioner and backlash prevention means comprises a spool axle 280, wherein the spool axle 280 is adapted and configured for supporting spools S of various axial hole diametric measures, which includes, but not limited to 0.625", 1.5", 2", and 2.5". The spool axle 280 defines an elongated body 282 having opposed ends, the opposed ends each slidably receive a first and second spool hole adapter 284 and 288. The opposed ends each include an annular ear 283, 283a which engages an outer surface of the spool axle retainer 66 and 136, thereby retaining the spool axle 280 therein during a spool S unwounding and wounding operation. The first spool hole adapter 284 includes a first enlarged cylinder 290 mounted, such as via welding, or integrally molded to a first smaller cylinder 292. A first annular brace 298 is mounted to an outer surface of the first enlarged cylinder 290. The second spool hole adapter 288 includes second enlarged cylinder 294 having a second smaller cylinder 296 and a second annular brace 299, the second annular brace 299 is mounted between the second enlarged cylinder 294 and the second smaller cylinder 296. An abutment ring 300 is mounted proximate a center of the body 282. When a spool S rotates in the unwinding direction, the second spool hole adapter 288 reciprocates axially along the body 282 between the abutment ring 300 and outer ear 283a causing the spool S axial hole to frictionally rotate about the body 282 thereby providing braking resistance to unwinding rotation of the spool S which creates and maintains tension applied to the wire, and thus, preventing excessive unwinding rotation of the cable wire due to angular momentum (backlash) when being unwound.

The second spool hole adapter 288 may be positioned to slidably engage the body 282 where the second annular brace 299 is positioned proximal to the abutment ring 300, as shown in FIG. 9, or reversed, as shown in FIG. 10, wherein the second annular brace 299 is positioned distal to the abutment ring 300.

Figure 11:
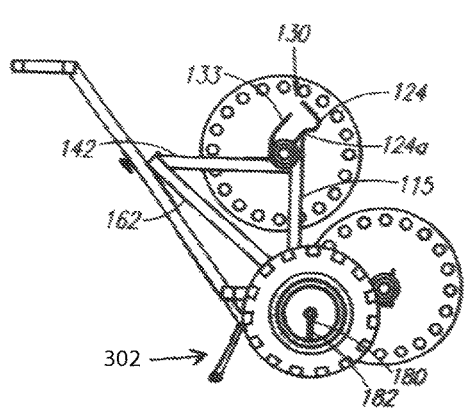
FIG. 11 is a side elevational view of the mobile wire dispenser apparatus shown self-supported in an upright orientation via a support mechanism.
Figure 12:
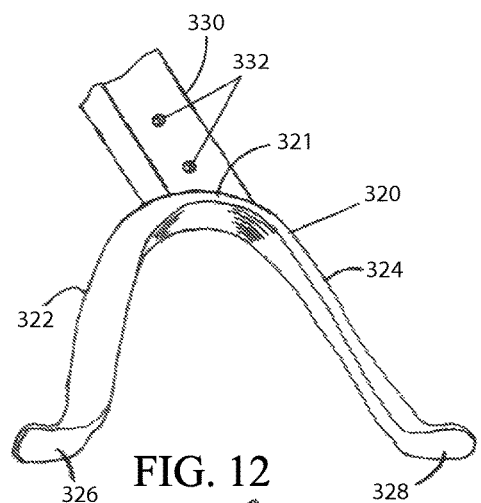
FIG. 12 is a partial perspective view of the support mechanism of FIG. 11.
Figure 13:
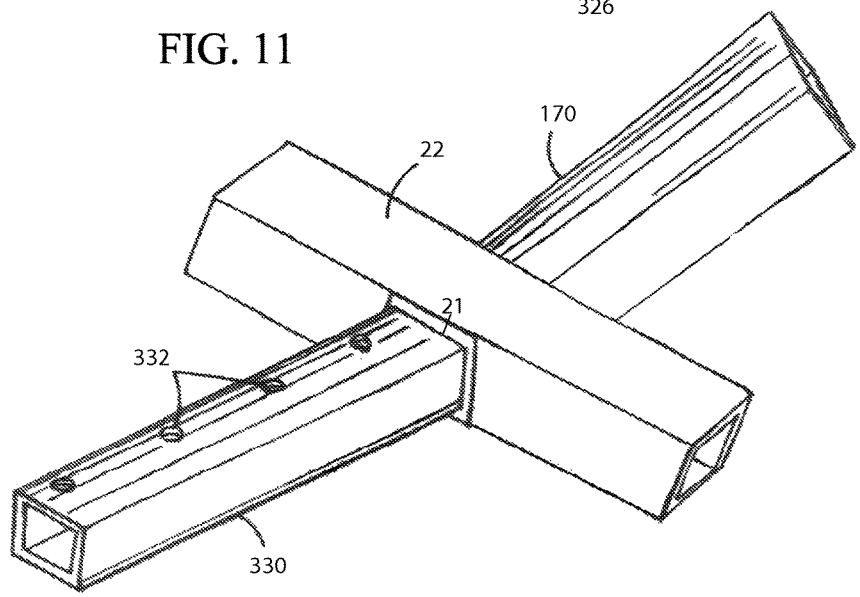
FIG. 13 is a partial perspective view of the support mechanism of FIG. 11 with the stand portion thereof removed, a neck portion of support mechanism is shown telescopically engaged with the handle.

Referring now to FIG. 11, a support mechanism 302 is provided for supporting the apparatus 10 in an upright or standing, self-supported manner without the aid or assistance of the operator. In reference to FIGS. 11-14, the support mechanism 302 comprises a stand 320, the stand 320 comprising a generally U-shaped configuration and having a curved shoulder 321 from which a first arm 322 and a second arm 324 downwardly depend spatially therefrom. Each arm 322 and 324 terminates in an incurvate foot 326 and 328, respectively, for engaging the ground or other generally horizontal surface. A cylindrical neck 330 is mounted angularly to the upper surface of the shoulder 321, wherein the angle at which neck 330 is mounted to the shoulder 321 is defined as obtuse. The neck 330 further includes at least one hole 332 defined axially through both sides thereof. Preferably, the neck 330 includes a series of holes 332. The neck 330 is telescopically received, or telescopically engages, the vertical member 22 of the base frame 20 via a bottom opening 21 thereof, and extends therefrom and telescopically engages the handle 170 via a cylinder receiving cavity 171 thereof. The stand 320 may be adjustably lockable at a desired longitudinal position or setting via a conventional locking assembly 310.

Figure 14:
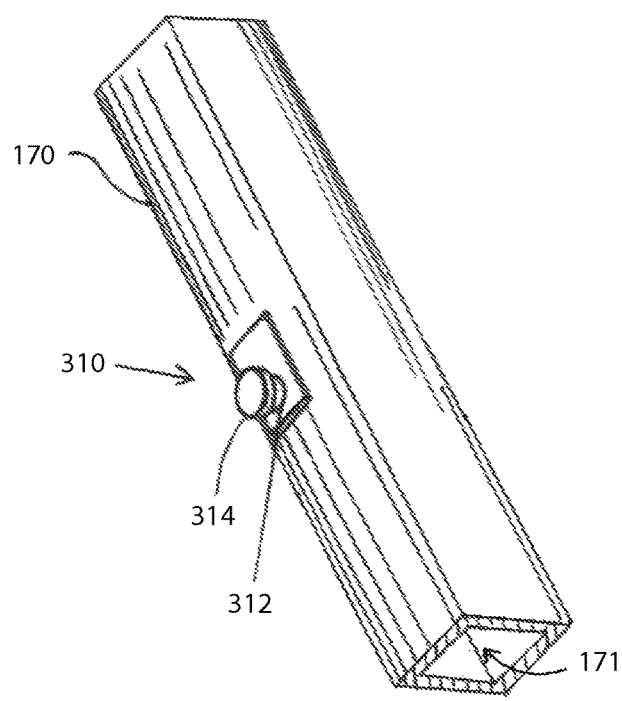
FIG. 14 is a partial perspective view of a locking assembly of the support mechanism, the locking assembly is shown disposed along a wall of the handle, in accordance to one embodiment of the present invention.

In accordance to one embodiment, the locking assembly 310 comprises a spring-biased pin assembly 312 disposed about the handle 170, as depicted in FIG. 14. The handle 170 includes a hole defined axially through both sides thereof, and the neck 330 includes a series of holes 332 defined through both sides thereof in corresponding relation so that a pin 314 of pin assembly 312 may be utilized to secure the neck 330 (and thus the stand 320) to the handle 170 at a desired longitudinal position. One of the holes of 332 of the neck 330 is aligned with the hole of the handle 170. The pin 314 extends through the entrance portion of the hole of the handle 170 and engages a selected hole 332 of neck and passes completely therethrough and exits through the exit portion of the hole of handle 170, thereby securing the neck 330 (and thus the support mechanism 302) to the handle 170. Thus, the holes 332 of neck 330 cooperate with the pin 314 of pin assembly 312 in a manner which permits the pin 314 to extend initially through the hole of handle 170, through a selected hole 332 of neck 330, and finally through the hole of the opposing side of handle 170, thereby securing the support mechanism 302 and handle 170 to one another.

In a resting position, pin 314 is urged by a spring (not shown) inwardly towards the cylinder receiving cavity 171 of handle 170. In order to adjustably secure the support mechanism 302 and handle 170 to a selectively-desired longitudinal setting, the pin 314 is retracted or pulled axially until pin 314 is effectively removed from the neck 330, and pin 314 is held in such retracted position, while the neck 330 is telescopically adjusted relative to the hole in handle 170 to obtain a desired longitudinal setting for the stand 320. Upon obtaining the desired longitudinal setting, the operator releases pin 314 to allow pin 314 to springably engage the desired hole of the series of holes 332 of neck 330.

In accordance to another embodiment, the support mechanism 302 may comprise a first linearly elongated cylinder telescopically engageable with a second linearly elongated cylinder, wherein the second cylinder is mounted contiguous to a bottom sidewall of the handle 170. The first and second elongated cylinders may be adjustably lockable at a desired longitudinal position or setting via a conventional locking assembly, such as the locking assembly 310 previously described. The neck 330 of the stand 320 may be telescopically received by the first elongated cylinder and detachably secured thereto via a pin. Alternatively, the stand 320 may be securably mounted (such as via arc welding) to a lower end of the first elongated cylinder.

In further accordance to the alternate embodiment, the locking assembly may comprise a spring-biased pin assembly disposed about the second cylinder. The second cylinder includes a hole defined axially through both sides thereof, and the first cylinder includes a series of holes defined through both sides thereof in corresponding relation so that the pin of the pin assembly may be utilized to secure the second cylinder and first cylinder at a desired longitudinal position. A selected hole of the neck is aligned with one of the holes of the first cylinder. The pin is extended through the entrance portion of the hole of first cylinder, through the hole 332 of neck 330, and finally through the exit portion of the hole of the opposing side of the first cylinder, thereby securing the neck 330 to the first cylinder. Further, the spring-biased pin extends through the hole of second cylinder and engages a selected hole defined through both sides of first cylinder and exits the hole of opposing side of second cylinder. Thus, the holes of first cylinder cooperate with the pin of pin assembly that permits the pin to extend initially through the hole of second cylinder, through a selected hole of first cylinder, and through the hole of opposing side of second cylinder, thereby securing the first and second cylinders to one another.

In a resting position, the pin is urged by a spring inwardly towards a cylinder receiving cavity of the second cylinder. In order to adjustably secure the first and second cylinders to a selectively-desired longitudinal setting, the pin is retracted or pulled axially until pin is effectively removed from the first cylinder, and pin is held in such retracted position, while the first and second cylinders are telescopically adjusted relative to one another to obtain a desired longitudinal setting for the stand 320. Upon obtaining the desired longitudinal setting, operator releases the pin to allow it to springably engage the desired hole of the series of holes of the first cylinder.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A mobile wire dispenser apparatus, the apparatus comprising:
    a base frame comprising a vertical member, a first horizontal member, and a second horizontal member, the vertical member having opposed free ends to which upper ends of the first horizontal member and the second horizontal member are welded or molded integral thereto, respectively;
    an upper frame being releasably lockable to the base frame, the upper frame comprising a first longitudinal member and a second longitudinal member;
    a pair of axle members for supporting a pair of wheels;
    a primary spool mounting assembly for supporting a first spool;
    a secondary spool mounting assembly for supporting a second spool;
    an elongated handle; and
    means for maintaining wire tension and for preventing wire backlash, wire recoil, and wire tangling, the means for maintaining wire tension and for preventing wire backlash, wire recoil, and wire tangling comprises at least one spool axle, wherein the at least one spool axle supports the first spool or the second spool, the at least one spool axle comprising:
    an elongated body having opposed ends, the opposed ends slidably receive a first spool hole adapter and a second spool hole adapter, respectively, wherein the opposed ends respectively comprise a first annular ear and a second annular ear, the first annular ear and the second annular ear engage an outer surface of spool axle retainers, respectively, of the mobile wire dispenser apparatus, thereby retaining the at least one spool axle therein during a spool unwounding and wounding operation; and
    an abutment ring, the abutment ring is mounted proximate a center or intermediate position of the elongated body.

2. The apparatus of claim 1, wherein the first spool hole adapter comprises:
    a first enlarged cylinder mounted or integrally molded to a first smaller cylinder; and
    a first annular brace mounted to an outer surface of the first enlarged cylinder.

3. The apparatus of claim 1, wherein the second spool hole adapter comprises:
    a second enlarged cylinder;
    a second smaller cylinder; and
    a second annular brace, the second annular brace is mounted between the second enlarged cylinder and the second smaller cylinder, and wherein during an unwinding of wire from the first spool or the second spool, the second spool hole adapter reciprocates axially along the elongated body between the abutment ring and the second annular ear causing a spool axial hole of the first spool or the second spool to frictionally rotate about the elongated body thereby providing braking resistance to an unwinding rotation of the first spool or the second spool which creates and maintains tension applied to the wire, and thus, preventing excessive unwinding rotation of the wire due to angular momentum when wire is being unwound.

4. The apparatus of claim 3, wherein the second enlarged cylinder is mounted between the second annular brace and the second annular ear, and wherein the second smaller cylinder is mounted between the abutment ring and the second annular brace.

5. The apparatus of claim 3, wherein the second enlarged cylinder is mounted between the abutment ring and the second annular brace, and wherein the second smaller cylinder is mounted between the second annular brace and the second annular ear.

6. The apparatus of claim 1, wherein the second spool hole adapter is reversibly positionable about the body.

7. The apparatus of claim 1, wherein the spool is selected from the group consisting of spools defined of various axial hole diametric measures.

* * * * *